(12) United States Patent
Vigano et al.

(10) Patent No.: US 10,787,598 B2
(45) Date of Patent: Sep. 29, 2020

(54) SHALE INHIBITORS BASED ON CATIONIC TAMARIND GUM, AND DRILLING FLUID COMPRISING THE SHALE INHIBITOR

(71) Applicant: LAMBERTI SPA, Albizzate (IT)

(72) Inventors: Laura Vigano, Parabiago (IT); Luigi Merli, Saronno (IT); Pierangelo Pirovano, Comerio (IT); Valentina Langella, Milan (IT); Mauro Riccaboni, Lagnano (IT); Giovanni Floridi, Novara (IT); Giuseppe Li Bassi, Gavirate (IT)

(73) Assignee: Lamberti SPA, Albizzate (VA) (IT)

( * ) Notice: Subject to any disclaimer, the term of this patent is extended or adjusted under 35 U.S.C. 154(b) by 80 days.

(21) Appl. No.: 15/551,845

(22) PCT Filed: Feb. 15, 2016

(86) PCT No.: PCT/EP2016/053150
§ 371 (c)(1),
(2) Date: Aug. 17, 2017

(87) PCT Pub. No.: WO2016/131762
PCT Pub. Date: Aug. 25, 2016

(65) Prior Publication Data
US 2018/0066172 A1 Mar. 8, 2018

(30) Foreign Application Priority Data

Feb. 17, 2015 (IT) .............................. UB2015A0203

(51) Int. Cl.
| | | |
|---|---|---|
| *C09K 8/90* | (2006.01) | |
| *C09K 8/035* | (2006.01) | |
| *C09K 8/68* | (2006.01) | |
| *C09K 8/60* | (2006.01) | |
| *C09K 8/467* | (2006.01) | |
| *C08B 37/00* | (2006.01) | |
| *C09K 8/08* | (2006.01) | |
| *C09K 8/52* | (2006.01) | |

(52) U.S. Cl.
CPC .......... *C09K 8/035* (2013.01); *C08B 37/0087* (2013.01); *C09K 8/08* (2013.01); *C09K 8/467* (2013.01); *C09K 8/52* (2013.01); *C09K 8/608* (2013.01); *C09K 8/68* (2013.01); *C09K 8/90* (2013.01); *C09K 2208/12* (2013.01)

(58) Field of Classification Search
CPC ........ C09K 17/14; C09K 17/22; C09K 17/32; C09K 17/38; C09K 17/52; C09K 8/035; C09K 2208/12; C09K 8/08; C09K 8/467; C09K 8/52; C09K 8/608; C09K 8/68; C09K 8/90
See application file for complete search history.

(56) References Cited

U.S. PATENT DOCUMENTS

| | | |
|---|---|---|
| 5,771,971 A | 6/1998 | Horton et al. |
| 6,247,543 B1 | 6/2001 | Patel et al. |
| 6,484,821 B1 | 11/2002 | Patel et al. |
| 6,609,578 B2 | 8/2003 | Patel et al. |
| 9,380,803 B2 | 7/2016 | Sworn et al. |
| 2002/0155956 A1 | 10/2002 | Chamberlain et al. |
| 2003/0106718 A1 | 6/2003 | Patel et al. |
| 2005/0065038 A1* | 3/2005 | Weaver .................... C09K 8/68 507/211 |
| 2007/0129258 A1 | 6/2007 | Patel et al. |
| 2010/0311621 A1* | 12/2010 | Kesavan ................... C09K 8/08 507/212 |

FOREIGN PATENT DOCUMENTS

| | | |
|---|---|---|
| CN | 103012613 * | 6/2016 |
| EP | 88121711.1 A2 | 12/1988 |
| WO | 2006130190 A1 | 2/2006 |
| WO | 2011083182 A2 | 7/2011 |
| WO | 2012153091 A1 | 11/2012 |
| WO | 2014027120 A2 | 2/2014 |
| WO | 2014191408 A1 | 12/2014 |

OTHER PUBLICATIONS

S. Pal et al. Cationic tamarind kernel polysaccharide (Cat TKP): A novel polymeric flocculant for the treatment of textile industry wastewater, International Journal of Biological Macromolecules 45 (2009) 518-523).*
Patel, A. et al., "Designing for the Future—A Review of the Design, Development and Testing of a Novel, Inhibitive Water-Based Drilling Fluid," 2002 Technical Conference, Houston, Texas Apr. 2-3.
Whistler, R. et al., Industrial Gums: Polysaccharides and their Derivatives, 3rd Edition, ISBN 02-12-746253-8, Academic Press, Inc., 1993. 642p.
Pal S et al., "Cationic tamarind kernel polysaccharide (Cat TKP): A novel polymeric flocculant for the treatment of textile industry wastewater", International Journal of Biological Macromolecules, vol. 45, No. 5, Dec. 1, 2009 (Dec. 1, 2009), pp. 518-523.
International Preliminary Report on Patentability for PCT/EP2016/053150 dated Aug. 22, 2017.
International Search Report for PCT/EP2016/053150 dated Aug. 25, 2016.
Keltrol/Kelzan xanthan gum Book; 8th Edition; CPKelco; A Huber Company; 2001-2008; CP Kelco U.S., Inc.
He Dong-bao, Li Li-Hua (College of Resouorces and Environmental Sciences, Wuhan University, Wuhan 430072, Hubei, China); "Study on the Gelation of Cationic Guar Gum and Xanthan Gum"; Wuhan University Journal (Natural Science Edition) 2003-02; 2 95 74173.

(Continued)

*Primary Examiner* — Kumar R Bhushan
(74) *Attorney, Agent, or Firm* — Iona Niven Kaiser; Vorys, Sater, Seymour and Pease LLP

(57) ABSTRACT

Method for inhibiting the swelling and the dispersion of shales in the treatment of subterranean shale formations comprising the use of a cationic tamarind gum and fluids for the treatment of subterranean shale formations comprising a cationic tamarind gum.

4 Claims, No Drawings

(56) References Cited

OTHER PUBLICATIONS

Cuddapah Sandeep, Tamal Krishna Dep, Afrasim Moin*, HG Shivakumar; "Cationic guar gum polyelectrolyte complex micro particles"; Department of Pharmaceutics, JSS College of Pharmacy, Mysore, Karnataka, India; Journal of Young Pharmacists; vol. 6; Issue 4; Oct.-Dec. 2014; pp. 11-19.

Gaio Paradossi, Ester Chiessi, Alberto Barbiroli and Dimitrios Fessas; "Xanthan and Glucomannan Mixtures: Synergistic Interactions and Gelation"; Department of Chemical Sciences and Technologies, University of Rome "Tor Vergata", via della Ricerca Scientifica, 00133 Rome, Italy, and INFM Section B Unita Roma Tor Vergata and Department of Food and Microbiological Sciences and Technologies, University of Milan, via Celoria 2, 2011 Milano, Italy; Biomacromolecules 2001, 3, 498-504.

Masakuni Tako; "The Principle of Polysaccharide Gels"; Advances in Bioscience and Biotechnology, Department of Subtropical Bioscience and Biotechnology, University of the Ryukyus, Nishihara, Okinawa, Japan; accepted Jan. 20 2015; published Jan. 27, 2015, 6, pp. 22-36.

Masakuni Tako, Atsushi Asato and Sanehisa Nakamura; "Rheological Aspects of the Intermolecular Interaction between Xanthan and Locust Bean Gum in Aqueous Media"; Department of Agricultural Chemistry, Faculty of Agriculture, University of Ryukyus, Nishihara-cho, Okinawa 903-01, Japan; Agric, Biol, Chem., 48 (12), pp. 2995-3000.

Masakuni Tako; "Synergistic interaction between xanthan and tara-bean gum"; Carbohydrate Polymers; vol. 16, Issue 3, 1991, pp. 239-252.

A. I. Rodriguez-Hernandez, A. Tecante; "Dynamic viscoelastic behavior of gellan-i-carrageenan and gellan-xanthan gels"; Food Hydrocolloids; vol. 13; Issue 1, Jan. 1, 1999; pp. 59-64.

F.M. Goycoolea, R.K. Richardson, and E.R. Morris; Department of Food Research and Technology, Silsoe College, Cranfield University, Silsoe, Bedford MK45 4DT, England; M. J. Gidley; Colworth Laboratory, Unilever Research, Shambrook, Bedford MK44 1LQ, England; "Stoichiometry and Conformation of Xanthan in Synergistic Gelation with Locust Bean Gum or Konjac Glucomannan: Evidence for Heterotypic Binding"; Revised Manuscript Revised Aug. 28, 1995; Macromolecules 1995; 28; pp. 8308-8320.

Long Xu, Mingzhe Dong, Houjian Gong, Mengjiao Sun, Yajun Lia; "Effects of Inorganic Cations on the Rheology of aqueous welan, xanthan, gellan solutions and their mixtures"; Carbohydrate Polymers; vol. 121, May 5, 2015; pp. 147-154.

Sworn, G. (2000). Xanthan gum. In G.O. Philips & P. A. Williams (Eds.), Handbook of hydrocolloids (1st ed., pp. 103-115). England: Woodhead, Cambridge.

* cited by examiner

SHALE INHIBITORS BASED ON CATIONIC TAMARIND GUM, AND DRILLING FLUID COMPRISING THE SHALE INHIBITOR

TECHNICAL FIELD

The present invention relates to a method for inhibiting the swelling and the dispersion of shales in the treatment of subterranean shale formations, i.e. in subterranean formations comprising or releasing shales. The method comprises the use of a cationic tamarind gum.

In another aspect, the invention relates to fluids for the treatment of subterranean shale formations comprising a cationic tamarind gum.

BACKGROUND OF THE ART

The subterranean treatment fluids, such as drilling fluids, may be classified according to their fluid base. Oil based fluids contain solid particles suspended in an oil continuous phase and, possibly, water or brine emulsified with the oil. Alternatively, water base fluids contain solid particles suspended in water or brine. Various other components may be added, deliberately or otherwise, to water based drilling fluids: a) organic or inorganic colloids, such as clays, used to impart viscosity and filtration properties; b) soluble salts or insoluble inorganic minerals used to increase the fluid density; c) other optional components that may be added to impart desirable properties, such as dispersants, lubricants, corrosion inhibitors, defoamers or surfactants; d) formation solids which may disperse into the fluid during the subterranean operations.

Formation solids that become dispersed in a drilling fluid include cuttings from drilling and soil and/or solids from the surrounding unstable formation. When the formation yields solids which can swell in water, hereinafter defined shales, they can potentially compromise drilling time and increase costs. Shales are mainly layered aluminum silicates, in which the dominant structure consists of layers formed by sheets of silica and alumina, that can have exposed oxygen atoms and hydroxyls. When atoms having different valences are positioned within the layers of the structure, they create a negative potential at the layer surface, which causes cations to be adsorbed thereto. These adsorbed cations are called exchangeable cations because they may chemically exchange places with other cations when the shale crystal is suspended in water. The type of substitutions occurring within the layers of the shale and the exchangeable cations adsorbed on the surface affect shale swelling.

There are different types of water swelling. For example surface hydration gives swelling with a large number of water molecules adsorbed by hydrogen interaction on the oxygen atoms exposed on the layer surfaces. All types of shale can swell in this manner.

Another type of swelling is called osmotic swelling. Where the concentration of cations between layers in a shale mineral is higher than the cation concentration in the surrounding water, water is osmotically drawn between the unit layers. Osmotic swelling results in larger overall volume increase than surface hydration. The shales that do not give this inter-layers swelling tend to disperse in water.

All types of shale swelling can cause a series of problems, for example sticking of the shales onto the drill string and bit, increasing torque and drag between the drill string and the sides of the borehole, caving or sloughing of the borehole walls and inducing an uncontrollable increase of the viscosity of the treatment fluid.

This is why the development of effective substances which reduce or block the swelling and/or the dispersion of shales, namely shale inhibitors, is important to the oil and gas industry. The present invention works towards a solution of these difficulties.

Several patents have been filed which describe techniques or compounds which can be used to inhibit shales, including inorganic salts such as potassium chloride, polyalkoxy diamines and their salts, described in U.S. Pat. Nos. 6,484,821, 6,609,578, 6,247,543 and US 2003/0106718, oligomethylene diamines and their salts, in U.S. Pat. No. 5,771,971 and US 2002/0155956. These compounds are mainly known as shale hydration inhibitors and principally they inhibit the shale swelling.

Another kind of shale inhibitors works by encapsulating, i.e. coating the surface of shales and inhibiting the dispersion and, at least partially, the swelling of the shales. In the prior art this is accomplished by preparing a synthetic molecule that has a polymeric backbone made of hydrocarbon, such as polyethylene onto which polar and/or ionic organic pendent groups, in particular cationic groups, are attached. These compounds are known as shale encapsulators and are often used in combination with shale hydration inhibitors.

While not intending to be bound by any specific theory, it is believed that the molecular structure of these encapsulators results in their strong adherence to the shale solid's surface, by way of the polar and/or ionic organic groups. As a result, the shale particles are encapsulated in a hydrophobic polymer coating that increases the action of the shale hydration inhibitors and thus prevents the swelling of the shale and, in particular, the dispersing of the shale by mechanical action. Alternatively it has been hypothesized that the strength of the polymer coating stiffly locks the shale sheets in their relative position and thus swelling and dispersion of the shales is inhibited.

An example of a shale encapsulator is described in US 2007/129258. This patent Application describes a drilling fluid comprising, as shale encapsulator, a cationic polyvinyl alcohol with a molecular weight comprised between 10,000 and 200,000 AMU.

Very few other patent applications have been filed on shale encapsulators and, often, the proposed compounds do not show satisfying performances. Therefore, there is a continuous need for the development of improved shale encapsulators and methods of using the same as shale inhibition agent in the treatment of subterranean shale formations.

The Applicant has now found that a cationic tamarind gum, a cationic xyloglucan polysaccharide, can be advantageously used as shale encapsulator in subterranean shale formations.

As far as the Applicant knows, cationic tamarind gum has never been proposed and described in the previous literature as shale encapsulator.

In the present text, with the expression "cationic degree of substitution" ($DS_{cat}$), we mean the average number of hydroxyl groups substituted with a cationic group on each anhydroglycosidic unit of the polysaccharide determined by means of $^1$H-NMR.

With the expression "hydroxyalkyl molar substitution" (MS), we mean the average number of hydroxyalkyl substituents on each anhydroglycosidic unit of the polysaccharide measured by means of $^1$H-NMR.

With the expression "hydrophobic degree of substitution" ($DS_H$), we mean average number of hydrophobic substituents on each anhydroglycosidic unit of the polysaccharide measured by means of gas-chromatography or $^1$H-NMR.

With the expression "carboxyalkyl degree of substitution" ($DS_{an}$), we mean the average number of hydroxyl groups substituted with a carboxyalkyl group on each anhydroglycosidic unit of the polysaccharide measured by means of titration.

As used herein, the expression "subterranean treatment," refers to any subterranean operation that uses a specific fluid in conjunction with a desired function and/or for a desired purpose.

DESCRIPTION OF THE INVENTION

It is therefore an object of the present invention a method for inhibiting the swelling and the dispersion of shales during the treatment of subterranean shale formations comprising the steps of:

a) providing a subterranean treatment fluid comprising between 0.2 and 6.0% wt of a cationic tamarind gum having a cationic degree of substitution (DScat) from 0.01 to 1.0 and a BROOKFIELD® RV viscosity at 4.0% wt water solution, 20 rpm and 20° C. below 2000 mPa*s;

b) introducing said treatment fluid into a well bore at a pressure sufficient to treat the subterranean shale formations.

In another aspect the invention relates to a drilling fluid comprising an aqueous continuous phase, between 0.2 and 6.0% wt of a cationic tamarind gum having a cationic degree of substitution (DScat) from 0.01 to 1.0 and a BROOKFIELD® RV viscosity at 4.0% wt water solution, 20 rpm and 20° C. below 2000 mPa*s, and between 1 and 70% wt of a weighting material.

DETAILED DESCRIPTION OF THE INVENTION

Preferably, the subterranean treatment fluid comprises between 0.5 and 4.0% wt of said cationic tamarind gum.

Tamarind (*Tamarindus Indica*) is a leguminous evergreen tall tree which grows in the tropics. Tamarind gum (tamarind powder or tamarind kernel powder) is obtained by extracting and purifying the powder obtained by grinding the seeds of tamarind.

Tamarind gum is a complex mixture containing a xyloglucan polysaccharide (55-75% wt), proteins (16-22% wt), lipids (6-10% wt) and certain minor constituents such as fibres and sugar.

The polysaccharide backbone consists of D-glucose units joined with (1-4)-β-linkages similar to that of cellulose, with a side chain of single xylose unit attached to every second, third and fourth of D-glucose unit through α-D-(1-6) linkage. One galactose unit is attached to one of the xylose units through β-D-(1-2) linkage.

There are basically two different grades of tamarind gum which are used in specific industrial applications like textile and pharmaceutical industries: oiled tamarind kernel powder and the de-oiled tamarind kernel powder. Both are useful for the realization of the present invention.

Other tamarind gums which have been subjected to other kind of treatment, such as enzymatic treatments or physico-chemical treatments, are also useful for the realization of the present invention.

The tamarind gum suitable for obtaining the cationic derivative of the invention has preferably a BROOKFIELD® RV viscosity, measured at 25° C.

The cationization of polysaccharides is well known in the art. Cationic substituents can be introduced on the tamarind gum by reaction of part of the hydroxyl groups of the xyloglucan gum with cationization agents, such as tertiary amino or quaternary ammonium alkylating agents. Examples of quaternary ammonium compounds include, but are not limited to, glycidyltrialkyl ammonium salts, 3-halo-2-hydroxypropyl trialkyl ammonium salts and halo-alkyltrialkyl ammonium salts, wherein each alkyl can have, independently one of the other, from 1 to 18 carbon atoms. Examples of such ammonium salts are glycidyltrimethyl ammonium chloride, glycidyltriethyl ammonium chloride, glycidyltripropyl ammonium chloride, glycidylethyldimethyl ammonium chloride, glycidyldiethylmethyl ammonium chloride, and their corresponding bromides and iodides; 3-chloro-2-hydroxypropyl trimethyl ammonium chloride, 3-chloro-2-hydroxypropyltriethyl ammonium chloride, 3-chloro-2-hydroxypropyltripropyl ammonium chloride, 3-chloro-2-hydroxypropylethyldimethyl ammonium chloride, 3-chloro-2-hydroxypropylcocoalkyldimethyl ammonium chloride, 3-chloro-2-hydroxypropylstearyldimethyl ammonium chloride and their corresponding bromides and iodides.

Examples of halo-alkyltrialkyl ammonium salts are 2-bromoethyl trimethyl ammonium bromide, 3-bromopropyltrimethyl ammonium bromide, 4-bromobutyltrimethyl ammonium bromide and their corresponding chlorides and iodides.

Quaternary ammonium compounds such as halides of imidazoline ring containing compounds may also be used.

In the typical embodiments of the invention the cationizing agent is a quaternary ammonium compound and preferably is 3-chloro-2-hydroxypropyltrimethyl ammonium chloride. The cationic substituent is in this case a chloride of a 2-hydroxy-3-trimethylammonium propyl ether group.

The cationic tamarind gum of the invention may also contain further substituent groups such as hydroxyalkyl substituents, wherein the alkyl represents a straight or branched hydrocarbon moiety having 1 to 5 carbon atoms (e.g., hydroxyethyl, or hydroxypropyl, hydroxybutyl) or hydrophobic substituents or carboxyalkyl substituents or combinations thereof.

The process for introducing a hydroxyalkyl substituent on a polysaccharide is well known in the art.

Typically, the hydroxyalkylation of a polysaccharide is obtained by the reaction with reagents such as alkylene oxides, e.g. ethylene oxide, propylene oxide, butylene oxide and the like, to obtain hydroxyethyl groups, hydroxypropyl groups, or hydroxybutyl groups, etc.

The hydroxyalkyl cationic tamarind gum may have a MS comprised between 0.1 and 3.0, preferably between 0.1 and 2.0, more preferably between 0.1 and 1.5.

The hydrophobization of the cationic tamarind gum of the invention is achieved by the introduction of hydrophobic group.

Examples of the introduction of hydrophobic groups on polysaccharides is reported for example in EP 323 627 and EP 1 786 840.

Typical derivatizing agents bringing a hydrophobic group include linear or branched $C_2$-$C_{24}$ alkyl and alkenyl halides, linear or branched alkyl and alkenyl epoxides containing a $C_6$-$C_{24}$ hydrocarbon chain and alkyl and alkenyl glycidyl ethers containing a $C_4$-$C_{24}$ linear or branched hydrocarbon chain.

A suitable glycidylether hydrophobizing agent can be, for example, butyl glycidyl ether, t-butyl glycidyl ether, 2-ethylhexyl glycidyl ether, dodecyl glycidyl ether, hexadecyl glycidyl ether, behenyl glycidyl ether and nonylphenyl glycidyl ether.

Representative alkyl epoxides include but are not limited to 1,2-epoxy hexane, 1,2-epoxy octane, 1,2-epoxy decane, 1,2-epoxy dodecane, 1,2-epoxy tetradecane, 1,2-epoxy hexadecane, 1,2-epoxy octadecane and 1,2-epoxy eicosane.

Exemplary halide hydrophobizing agents include but are not limited to ethyl, propyl, isopropyl, n-butyl, t-butyl, pentyl, neopentyl, hexyl, octyl, decyl, dodecyl, myristyl, hexadecyl, stearyl and behenyl bromides, chlorides, and iodides.

Other derivatizing agents suitable for the hydrophobic modification include alkyl- and alkenyl-β-hydroxy-γ-chloropropyl ethers and epoxy derivatives of triglycerides.

In a preferred embodiment of the invention the cationic substituent is 2-hydroxy-3-trimethylammoniumpropyl ether chloride and the hydrophobic substituent contains a linear alkyl or alkenyl chain containing between 6 and 24 carbon atoms or a mixture of such alkyls or alkenyls.

The hydrophobically modified cationic tamarind gum of the invention may have hydrophobic degree of substitution ($DS_H$) of from $1*10^{-5}$ to $5*10^{-1}$, preferably from $1*10^{-4}$ to $1*10^{-1}$.

In a further particular embodiment the cationic tamarind gum of the invention can contain both hydroxyalkyl substituents and hydrophobic substituents. In this case the MS is comprised between 0.1 and 3.0 and the $DS_H$ is between $1*10^{-5}$ and $5*10^{-1}$.

In another embodiment the cationic tamarind gum of the invention is carboxyalkylated, with a degree of carboxyalkyl substitution ($DS_{AN}$) ranging from 0.01 to 1.0.

Halo-carboxylic acids or their salts can be used for the preparation of carboxyalkyl cationic tamarind gum. The preferred halo-carboxylic acid is monochloro-acetic acid.

The cationic tamarind gum of the present invention can be prepared by known processes. For example, the cationic substituents can be introduced by reaction of the tamarind gum with the cationizing agent, in the presence of a base, such as sodium hydroxide.

The introduction of the different substituents (cationic, carboxyalkyl hydroxyalkyl and/or hydrophobic) on the tamarind gum backbone can follow any order.

When the cationic tamarind gum of the invention also contains hydroxyalkyl substituents, they may also be introduced in the last step, after the cationization and the optional hydrophobization have occurred.

Further indications about the preparation of the cationic derivatives of tamarind gum suitable for the realization of the present invention can be found in the literature, for example in "Industrial Gums: Polysaccharides and their Derivatives", 3rd Ed., Whistler, Roy L., and BeMiller, James N., Academic Press (1993).

In an exemplary production process, the cationic tamarind gum is obtained operating as follows: tamarind gum, possibly dispersed in water, or an inert diluent which can be chosen among lower aliphatic alcohols, ketones, or liquid hydrocarbons, or mixtures of the above, is treated at ambient temperature with an alkali-hydroxide in aqueous solution and then heated to 50-90° C. The reaction mass system is then set to about 50° C. and the cationizing agent and the optional hydroxyalkylating agents, for example ethylene oxide and/or propylene oxide, or carboxyalkylating and/or hydrophobizing agents, are introduced into the reactor, possibly dispersed in inert organic diluents. The reaction is completed by setting the temperature at 40-80° C. for 1-3 hours.

In one embodiment of the invention, the cationic tamarind gum is subjected to an additional treatment with a base after the cationization, that allows to produce cationic polysaccharide derivatives free from toxic compounds, such as 3-chloro-2-hydroxypropyltrimethyl ammonium chloride or 2,3-epoxypropyltrimethyl ammonium chloride. This post-cationization treatment is described more accurately in the patent application WO 2014/027120.

After the preparation, the cationic tamarind gum can be treated with several known reagents, for example: caustic; acids; biochemical oxidants, such as galactose oxidase; chemical oxidants, such as hydrogen peroxide; and enzymatic reagents; or by physical methods using high speed agitation machines, thermal methods; and combinations of these reagents and methods. Reagents such as sodium metabisulfite or inorganic salts of bisulfite may also be optionally included.

These treatments can be also performed on the tamarind gum before the derivatization process.

In a preferred embodiment, the cationic tamarind gum is a depolymerized cationic tamarind gum, which has been depolymerised by using chemicals, such as hydrogen peroxide, or cellulase enzymes.

In a further embodiment, a purification step can be performed to obtain a particularly pure product.

The purification step may take place by extraction of the impurities with water or aqueous-organic solvent before a final drying step so as to remove the salts and by-products formed during the reaction.

In a further preferred embodiment, the cationic tamarind gum of the present invention is left unpurified (usually called "crude" or technical grade) and still contains by-products generated during its chemical preparation (that is during cationization of the tamarind gum and the other possible derivatizations).

This unpurified cationic tamarind gum can contain from 4 to 65% by dry weight of by-products such as, cationizing agents and their degradation products, for example 2,3-dihydroxypropyltrimethyl ammonium chloride, and inorganic salts deriving from the neutralization of the bases used for the reaction, glycols and polyglycols deriving from the alkylene oxides, etc.

Preferably, the cationic tamarind gum of the invention has a DScat comprised between between 0.05 and 0.55 and a a BROOKFIELD® RV viscosity, measured at 20° C. and 20 rpm in a 4.0% by weight water solution, comprised between 30 and 1500 mPa*s.

In a particularly preferred embodiment of the invention, the cationic tamarind gum contains only cationic substituents and has a DScat comprised between 0.1 and 0.45 and a BROOKFIELD® RV viscosity, measured at 20° C. and 20 rpm in a 4.0% by weight water solution, comprised between 100 and 1000 mPa*s.

The weight average molecular weight ($M_w$) of the cationic tamarind gum useful for the invention ranges typically between 10,000 and 4,000,000 Dalton, preferably between 100,000 and 1,000,000 Dalton and more preferably between 350,000 and 750,000 Dalton.

The cationic tamarind gums of the invention can be used as ingredients in the most different subterranean treatment fluids, where their capability of binding through their positive charges to substrates having weak negative charges, such as shales, are fully exploited.

Typically, the subterranean treatment fluid of the invention can comprise an aqueous continuous phase and a weighting material, which can be selected from: barite, hematite, ilmenite, iron oxide, calcium carbonate, magnesium carbonate, magnesium organic and inorganic salts, calcium chloride, calcium bromide, magnesium chloride, zinc halides, alkali metal formates, alkali metal nitrates, and combinations thereof. Usually, the subterranean treatment fluid can contain between 1 and 70% wt of weighting material, depending on the desired density.

The aqueous continuous phase may be selected from: fresh water, sea water, brine, mixtures of water and water-soluble organic compounds, and mixtures thereof.

In a preferred embodiment of the invention, the subterranean treatment fluid further comprises from 0.1 to 20% wt, preferably from 0.1 to 15% wt, of a shale hydration inhibitor.

Any shale hydration inhibitors commonly used in the field can be added to the subterranean treatment fluid of the present inventions.

Examples are potassium salts; inorganic and organic phosphates; silicates; polyalkoxy diamines and their salts, for example those sold with the commercial name of Jeffamine®; choline derivatives; diamines, triamines, polyamines and their salts; high boiling by-products of hexamethylenediamine purification and their salts; partially hydrolyzed (meth)acrylamide copolymers (PHPA) and their cationic derivatives; dialkyl aminoalkyl (meth)acrylate/ (meth)acrylamide copolymers; quaternary ammonium compounds; cationic polyvinyl alcohols; and mixtures thereof.

Examples of diamines are diamines with a saturated $C_2$-$C_8$ alkyl chain, such as 1,6-hexamethylene diamine, 1,2-ethylene diamine, 1,3-propylene diamine, 1,4-butane diamine, 1,5-pentane diamine, 1,2-cyclohexane diamine and mixtures thereof.

Examples of triamines and polyamines are diethylene triamine, bis-hexamethylene-triamine, triethylene tetramine and tetraethylene pentamine, higher amines, and mixtures thereof.

Examples of polyalkoxy diamines are those represented by the general formula I:

$$NH_2\text{—}R\text{—}[OR_1]_x\text{—}NH_2 \quad (I)$$

in which x has a value from 1 to 25 and R and $R_1$ are, independently one of the other, alkylene groups having from 1 to 6 carbon atoms.

The amine salts useful for the realization of the invention are of the inorganic or of the organic kind, the preferred salts being salts formed with hydrochloric acid, phosphoric acid, formic acid, acetic acid, lactic acid, adipic acid, citric acid, etc., more preferably with hydrochloric acid or acetic acid.

Advantageously, the shale hydration inhibitor of the invention is a high boiling by-product of hexamethylenediamine purification (product that is commercially known as HMDA bottoms) or a salt thereof. These products, described in WO 2011/083182, typically comprise variable amounts of bis-hexamethylene-triamine.

The typical content of amines of HMDA bottoms is the following (% wt):

| | |
|---|---|
| Bis-hexamethylene-triamine | 20-50 |
| Hexamethylendiamine | 20-70 |
| 1,2-Cyclohexanediamine | 0-30 |
| Higher amines | 0-20 |

Preferred shale hydratation inhibitors are potassium salts, diamines, triamines, polyamines, polyalkoxy diamine represented by the general formula I, their salts, and mixture thereof. Potassium salts, such as potassium chloride, potassium acetate, potassium carbonate, potassium formate are the most preferred.

The subterranean treatment fluid of the present invention comprises other normally used additives, well known by those skilled in the art, such as viscosifying agents, such as xanthan gum, dispersing agents, lubricants, fluid loss control agents, corrosion inhibitors, defoaming agents and surfactants.

In an embodiment of the present invention, the treatment fluid further contains from 0.1 to 15% by weight of a defoaming agent.

The defoaming agent can be any defoaming agent known in the art. As used herein, "defoaming agent" includes any compound, mixture or formulation that may prevent the formation of foam or reduce or eliminate previously formed foam.

In exemplary embodiments, the defoaming agent can be: hydrocarbon materials, for examples mineral oils, liquid paraffins, alpha-olefins, paraffinic or natural waxes; silicones, such as polyorganosiloxanes; alkylene oxide derivatives, such as $C_8$-$C_{24}$ alcohol and $C_8$-$C_{26}$ carboxylic acid alkoxylates and ethylene oxide/propylene oxide (EO/PO) block copolymers and $C_8$-$C_{26}$ carboxylic acid esters thereof; carboxylic acids and their salts, for example saturated and unsaturated, linear or branched, $C_8$-$C_{26}$ carboxylic acids and $C_{18}$-$C_{54}$ polycarboxylic acids and their salts with multivalent metal cation, such as aluminum or alkaline earth metal salts; organic esters, such as esters of $C_8$-$C_{26}$ carboxylic acids with monohydric to polyhydric $C_1$-$C_{24}$ alcohols; bis-amidi; higher alcohols, such as $C_8$-$C_{48}$ linear and branched alcohols; trialkyl phosphates; and mixtures thereof.

In a preferred embodiment, the defoaming agent is pre-mixed with the cationic tamarind gum before its dissolution in the treatment fluid, for example at the end of the chemical preparation of the cationic xyloglucan.

Those skilled in the art know the correct order of addition of the components to avoid compatibility problems, which may arise in presence of anionic and cationic materials.

For example, when xanthan gum is used as viscosifying agent, xanthan gum and the cationic tamarind gum are preferably added into the fluid after the dissolution of a potassium salt, such as potassium chloride.

The subterranean treatment fluid of the present invention is suitable for use in any treatment of subterranean formations wherein shale inhibitors can be necessary. The fluid disclosed herein is useful in the drilling, completion and working-over of subterranean oil and gas wells and also in stimulation operations (such as fracturing), gravel packing, cementing, maintenance, reactivation, cuttings reinjection etc. Preferably the subterranean treatment fluid is a drilling fluid.

The following examples are included to demonstrate the preferred embodiments of the invention.

EXAMPLES

Example 1

In a 5 litres stirred reactor, 800 g of deoiled tamarind gum were loaded at room temperature and the atmosphere was made inert by means of vacuum/nitrogen washings. A mixture of 100 g of water and 316 g of isopropyl alcohol was added and stirred for 10 minutes. Then 171 g of an aqueous 50% wt sodium hydroxide solution were sprayed on the mixture, which was subsequently homogenized for 15 minutes. The mass was heated at 70° C. for 1 hour and then cooled at 45° C. 396 g of an aqueous 65% wt solution of 3-chloro-2-hydroxypropyl trimethyl ammonium chloride (QUAB® 188 65% from Quab Chemicals) were added and the mixture was heated to 50° C. for 2 hours. After this period 142 g of an aqueous 30% wt of sodium hydroxide solution and 4 g of hydrogen peroxide 130 volumes were added. The reaction mass was heated at 70° C. for one hour then cooled to 40° C. and the pH was adjusted to about 7 with acetic acid. The solvent was distilled off and the cationic tamarind gum was dried on a fluid bed drier using hot air until the moisture content was about 3% by weight and then milled.

Example 2

In a 5 litres stirred reactor, 800 g of deoiled tamarind gum and 85 g of sodium hydroxide were loaded at room temperature and the atmosphere was made inert by means of vacuum/nitrogen washings. A mixture of 100 g of water and 316 g of isopropyl alcohol was added and stirred for 15 minutes. The reaction mass was heated at 70° C. for one hour then cooled to 45° C. 396 g of QUAB® 188 65% were added and the mixture was heated to 50° C. for 2 hours. After this period 55 g of an aqueous 30% wt sodium hydroxide solution and a solution of 4 g of hydrogen peroxide 130 volumes in 20 g of water were added. The reaction mass was heated at 70° C. for one hour then cooled to 40° C. and the pH was adjusted to about 7 with acetic acid. The solvent was distilled off and the cationic tamarind gum was dried on a fluid bed drier using hot air until the moisture content was about 3% by weight and then milled.

Example 3

In a 5 litres stirred reactor, 800 g of deoiled tamarind gum were loaded at room temperature and the atmosphere was made inert by means of vacuum/nitrogen washings. A mixture of 270 g of an aqueous 30% wt sodium hydroxide solution, 50 g of water and 316 g of isopropyl alcohol was added and stirred for 15 minutes. Then a solution of 4 g of hydrogen peroxide 130 volumes in 100 g of water were added and the reaction mass was heated at 40° C. for 45 minutes and then at 70° C. for one hour. The mixture was cooled to 45° C. and 396 g of QUAB® 188 65% were added and the mixture was heated to 50° C. for 2 hours. After this period 100 g of an aqueous 30% wt sodium hydroxide solution was added and reaction mass was heated at 45° C. for one hour. The pH was adjusted to about 7 with acetic acid, the solvent was distilled off and the cationic tamarind gum was dried on a fluid bed drier using hot air until the moisture content was about 3% by weight and then milled.

Example 4

In a 5 litres stirred reactor, 800 g of deoiled tamarind gum were loaded at room temperature and the atmosphere was made inert by means of vacuum/nitrogen washings. A mixture of 180 g of water and 220 g of isopropyl alcohol was added and stirred for 10 minutes. Then 180 g of an aqueous 30% wt sodium hydroxide solution were sprayed on the mixture, which was then homogenized for 15 minutes. 256 g of QUAB® 188 65% were added and the mixture was heated to 50° C. for 2 hours. The pH was adjusted to about 7 with acetic acid. The solvent was distilled off and the cationic tamarind gum was dried on a fluid bed drier using hot air until the moisture content was about 3% by weight and then milled.

Example 5

In a 5 litres stirred reactor, 800 g of deoiled tamarind gum and 100 g of sodium hydroxide were loaded at room temperature and the atmosphere was made inert by means of vacuum/nitrogen washings. A mixture of 100 g of water and 316 g of isopropyl alcohol was added and stirred for 15 minutes. The mass was heated at 70° C. for 1 hour and then cooled at 45° C. 520 g of QUAB® 188 65% were added and the mixture was heated to 50° C. for 2 hours. After this period 95 g of an aqueous 30% wt sodium hydroxide solution and a solution of 4 g of hydrogen peroxide 130 volumes in 20 g of water were added. The reaction mass was heated at 70° C. for one hour then cooled to 40° C. and the pH was adjusted to about 7 with acetic acid. The solvent was distilled off and the cationic tamarind gum was dried on a fluid bed drier using hot air until the moisture content was about 3% by weight and then milled.

Example 6

In a 5 litres stirred reactor, 800 g of tamarind gum and 85 g of sodium hydroxide were loaded at room temperature and the atmosphere was made inert by means of vacuum/nitrogen washings. A mixture of 100 g of water and 316 g of isopropyl alcohol was added and stirred for 15 minutes. The mass was heated at 70° C. for 1 hour and then cooled at 45° C. 396 g of QUAB® 188 65% were added and the mixture was heated to 50° C. for 2 hours. Then 55 g of an aqueous 30% wt sodium hydroxide solution were added and the reaction mass was heated at 50° C. for two hours. The reaction was cooled to 40° C. and the pH was adjusted to about 7 with acetic acid. The solvent was distilled off and the cationic tamarind gum was dried on a fluid bed drier using hot air until the moisture content was about 3% by weight and then milled.

Example 7

In a 5 litres stirred reactor, 800 g of deoiled tamarind gum were loaded at room temperature and the atmosphere was made inert by means of vacuum/nitrogen washings. A mixture of 100 g of water and 316 g of isopropyl alcohol was added. After 10 minutes of stirring, 171 g of an aqueous 50% wt sodium hydroxide solution were sprayed on the mixture, which was then homogenized for 15 minutes. The mass was heated at 70° C. for 1 hour and then cooled at 45° C. 396 g of QUAB® 188 65% were added and the mixture was heated to 50° C. for 2 hours. After this period 85 g of an aqueous 50% wt sodium hydroxide solution and a solution of 3 g of hydrogen peroxide 130 volumes in 57 g of water were added. The reaction mass was heated at 40° C. for 40 minutes and then at 70° C. for one hour. The mixture was cooled to 40° C. and the pH was adjusted to about 7 with acetic acid. The solvent was distilled off and the cationic tamarind gum was dried on a fluid bed drier using hot air until the moisture content was about 3% by weight and then milled.

Example 8

A suspension of 40 g of the cationic tamarind gum of Example 7 in 180 ml of IPA and 20 ml of water was refluxed for 3 hours. The solid was collected by filtration and dispersed in 160 ml of IPA and 40 ml of water. The dispersion was refluxed for 3 hours, filtered and the solid was sequentially washed with IPA/water 6/4, then IPA/water 8/2 and finally with pure IPA. The purified cationic tamarind gum was dried at 80° C. for 16 hours.

Example 9

In a 1 litre stirred reactor, 50 g of a commercial hydroxypropyl tamarind, gum with a MS of 0.58 and a BROOK- FIELD® RV viscosity of 10,150 mPa*s (7% water solution, 20° C. and 20 rpm), were loaded at room temperature and the atmosphere was made inert by means of vacuum/nitrogen washings. A mixture of 47 g of water, 375 g of isopropyl alcohol and 28 g of an aqueous 30% wt sodium hydroxide solution was added. After 15 minutes of stirring, 29 g of QUAB® 188 65% were added and the reaction mass was heated to 50° C. for 3 hours.

The resulting suspension was cooled at room temperature and filtered under vacuum. The obtained cake was sequentially washed with IPA/water 8/2 and IPA. The solid was dried at 80° C. for 16 hours.

Example 10

In a 1 litre stirred reactor, 50 g of cold-water soluble tamarind gum were loaded at room temperature and the atmosphere was made inert by means of vacuum/nitrogen washings. A mixture of 47 g of water, 375 g of isopropyl alcohol and 28 g of an aqueous 30% wt sodium hydroxide solution was added. After 15 minutes of stirring, 12 g of 2-bromoethyl trimethyl ammonium bromide were added and the obtained mixture was heated to 50° C. for 3 hours. The resulting suspension was cooled at room temperature and filtered under vacuum. The cake was sequentially washed with IPA/water 8/2 and IPA. The product was dried at 80° C. for 16 hours Cationic Tamarind Gum Characterization The cationic degree of substitution (DScat) of the cationic tamarind gums of Examples 1-10 was determined by 1H-NMR.

The hydroxypropyl molar substitution (MS) was determined by 1H-NMR.

The BROOKFIELD® RV viscosity (RV Viscosity) was measured on a 4.0% by weight solution in water at 20° C. and 20 rpm.

The weight average molecular weight (Mw) was determined by gel permeation chromatography using a Perkin Elmer Liquid Chromatograph Series 200 Pump, an Ultrahydrogel® guard column, an Ultrahydrogel® Linear column and an Evaporative Light Scattering Detector ELSD 3300. The mobile phase was water containing 1.4% v/v TEA and 1.0% v/v glacial acetic acid at a flow of 0.8 ml/min. A pullulan standard kit (molecular weight range: 5,900-788,000 Dalton) was used for the calibration of the system.

The calculation was performed by the chromatographic software SW TurboSEC 6.2.1.0.104:0104 with a Universal Calibration method. The following values of the Mark-Houwink constants K and α were assigned:

|  | K (dl/g) | α |
| --- | --- | --- |
| Pullulans | 0.00019 | 0.67 |
| Cationic Tamarind Gums | 0.00038 | 0.723 |

Table 1 summarizes the characteristics of the cationic tamarind gums of Examples 1-10.

TABLE 1

|  | $DS_{cat}$ | MS | RV Viscosity (mPa*s) | $M_w$ (Dalton) |
| --- | --- | --- | --- | --- |
| Example 1 | 0.27 | — | 225 | 612,390 |
| Example 2 | 0.32 | — | 316 | 613,942 |
| Example 3 | 0.24 | — | 770 | 771,355 |
| Example 4 | 0.12 | — | 915 | 758,564 |
| Example 5 | 0.39 | — | 155 | 578,863 |
| Example 6 | 0.21 | — | 640 | 733,605 |
| Example 7 | 0.30 | — | 470 | 737,439 |
| Example 8 | 0.30 | — | 591 | 683,373 |
| Example 9 | 0.40 | 0.47 | <100 | 105,857 |
| Example 10 | 0.12 | — | <100 | 23,248 |

Performance Evaluation

The shale inhibition performances of the cationic tamarind gums were evaluated with three different kinds of shales: an Arne clay (dispersive), a Foss Eikeland clay (dispersive) and an Oxford clay (swellable).

Each clay was dried at 70° C. for 3 hours.

The dried clays were then ground and sieved through both a 5 mesh (4 mm) sieve and a 10 mesh (2 mm sieve).

The clay particles with a size below 4 mm but larger than 2 mm were used in this test.

Two different methods of evaluation were used: the "Shale Particle Disintegration Test" and the "Bulk Hardness Test".

Shale Particle Disintegration Test

The test was performed following the procedure described in the standard method ISO10416, section 22, with some modifications.

350 ml of typical drilling muds were prepared by means of an Hamilton Beach Mixer according to the formulations described in Table 2.

For the preparation of the muds, the following commercial product were used:

Biolam XG, xanthan gum commercialized by Lamberti S.p.A.;

PREGEFLO M, pre-gelatinezed corn starch commercialized by Roquette;

Defoam-X, defoamer commercialized by M-I Swaco;

Calcitec V/60, $CaCO_3$ commercialized by Mineraria Sacilese S.p.A.

The starch was added to the muds 9-11 in order to reach the same viscosity of the other muds, determined with a Fann® 35 at 600 rpm and 25° C.

All muds were adjusted to pH 9.0 by adding some drops of NaOH solution 20% wt.

30.0 g of sized clay were added to each mud in a stainless steel ageing cell which was subsequently closed and vigorously shacked to disperse the clay particles.

The ageing cells were then placed in a pre-heated oven and hot-rolled at 80° C. for 16 hours.

After the thermal treatment, each ageing cell was cooled to room temperature.

The treated muds were then poured onto two sieves: 10 mesh (2 mm) and 35 mesh (0.5 mm).

The residual clays in the bottles were recovered by washing with a KCl solution (42.75 g/l).

The sieves were transferred in a bath containing tap water and quickly but gently submerged in order to rinse both the sieve and the clays.

The recovered clays were then placed in a pre-weighed dish and dried in oven at 105° C. to constant weight.

After drying, the clays were cooled in a desiccator and weighed. The % recovery of the clays for each mud was calculated with following formula:

% recovery=(weight in grams of shale recovered)/ $(100-w_h) \times 100$ where $w_h$ is the initial moisture content in % by weight of the sized clay. The initial moisture content of the clay was determined by weight loss at 105° C.

The results (% recovery) with Arne Clay and Foss Eikeland Clay are reported in Table 3 and 4, respectively.

The higher the % recovery, in particular on the 10 mesh sieve, the higher the performance of the shale inhibitors.

The results reported in Tables 3 and 4 demonstrate that the cationic tamarind gums of the invention show very good inhibition properties on dispersive shales (Arne and Foss-Eikeland Clays).

30.0 g of sized Oxford Clay were added to each mud in a stainless steel ageing cell which was subsequently closed and carefully shaked to disperse the clay particles. The ageing cells were then subjected to the same thermal treatment described in the previous test.

The treated muds were then poured onto a 10 mesh sieve. The residual clays in the bottles were recovered by washing with a KCl solution (42.75 g/l).

The sieves were transferred in a bath containing tap water and it is quickly but gently submerged in order to rinse the sieve and the shale.

TABLE 2

|  | Mud 1 | Mud 2 | Mud 3 | Mud 4 | Mud 5 | Mud 6 | Mud 7 | Mud 8 | Mud 9 | Mud 10 | Mud 11* |
|---|---|---|---|---|---|---|---|---|---|---|---|
| Tap water | 330 | 330 | 330 | 330 | 330 | 330 | 330 | 330 | 330 | 330 | 330 |
| Potassium Chloride | 10.5 | 10.5 | 10.5 | 10.5 | 10.5 | 10.5 | 10.5 | 10.5 | 10.5 | 10.5 | 10.5 |
| BIOLAM XG | 1.2 | 1.2 | 1.2 | 1.2 | 1.2 | 1.2 | 1.2 | 1.2 | 1.2 | 1.2 | 1.2 |
| PREGEFLO M |  |  |  |  |  |  |  |  | 5 | 5 | 9 |
| Example 1 | 5.5 |  |  |  |  |  |  |  |  |  |  |
| Example 2 |  | 5.5 |  |  |  |  |  |  |  |  |  |
| Example 3 |  |  | 5 |  |  |  |  |  |  |  |  |
| Example 4 |  |  |  | 4 |  |  |  |  |  |  |  |
| Example 5 |  |  |  |  | 5.5 |  |  |  |  |  |  |
| Example 6 |  |  |  |  |  | 5 |  |  |  |  |  |
| Example 7 |  |  |  |  |  |  | 5 |  |  |  |  |
| Example 8 |  |  |  |  |  |  |  | 5 |  |  |  |
| Example 9 |  |  |  |  |  |  |  |  | 6 |  |  |
| Example 10 |  |  |  |  |  |  |  |  |  | 6 |  |
| Defoam-X | 0.1 | 0.1 | 0.1 | 0.1 | 0.1 | 0.1 | 0.1 | 0.1 | 0.1 | 0.1 | 0.1 |
| Calcitec V/60 | 30 | 30 | 30 | 30 | 30 | 30 | 30 | 30 | 30 | 30 | 30 |

*Comparative

TABLE 3

| Arne Clay | % Recovery 10 mesh | % Recovery 35 mesh | Total % Recovery |
|---|---|---|---|
| Mud 1 | 99.7 | 0.3 | 100 |
| Mud 2 | 89.9 | 2.3 | 92.2 |
| Mud 3 | 76.9 | 3.2 | 80.1 |
| Mud 4 | 68.1 | 5.4 | 73.5 |
| Mud 5 | 99.2 | 0.8 | 100 |
| Mud 6 | 71.2 | 1.6 | 72.8 |
| Mud 7 | 99 | 1 | 100 |
| Mud 8 | 69.5 | 1.8 | 71.3 |
| Mud 9 | 39 | 3.3 | 42.3 |
| Mud 10 | 63.5 | 3.5 | 67 |
| Mud 11* | 5.3 | 14 | 19.3 |

*Comparative

TABLE 4

| Foss Eikeland Clay | % Recovery 10 mesh | % Recovery 35 mesh | Total % Recovery |
|---|---|---|---|
| Mud 1 | 35.4 | 34.5 | 69.9 |
| Mud 11* | 16 | 23 | 39 |

*Comparative

Bulk Hardness Test

This test was described by Patel A. et al., in "Designing for the future—a review of the design, development and inhibitive water-based drilling fluid"; Drilling and Completion Fluids and Waste Management, Houston (Tex.), Apr. 2-3, 2002. Some modifications were introduced.

350 ml of Mud 5 and comparative Mud 11, previously described, were adjusted to pH 9.0 by adding some drops of NaOH 20 wt % solution.

Using a torque wrench, the recovered clays were extruded through a perforated plate, measuring the torque required for each turn in compression. The torque is directly correlated to the hardness of the clay particles and, since the clay particles which are not inhibited swell in the fluid and become softer, to the shale inhibitor efficiency. To say, the higher the torque value, the better the performance of the inhibitor. The average torque values relative to the 14th, 15th and 16th turn are reported in Table 5.

TABLE 5

| Torque (N*m) | Mud 5 | Mud 11* |
|---|---|---|
| Oxford Clay | 22.0 | 10.0 |

The results reported in Table 5 demonstrate that the cationic tamarind gums of the invention show very good inhibition properties also with swellable shale (Oxford Clay).

The invention claimed is:

1. A method for inhibiting the swelling and the dispersion of shales during the treatment of subterranean shale formations comprising:
   introducing into a wellbore a subterranean treatment fluid comprising from about 0.2 to about 6.0% wt of a cationic tamarind gum having a cationic degree of substitution ($DS_{cat}$) of from about 0.01 to about 1.0 and a Brookfield RV viscosity at 4.0% wt water solution, 20 rpm and 20° C. of less than about 2000 mPa*s, the treatment fluid further comprises xanthan gum;
   wherein the treatment fluid is introduced into the wellbore at a pressure sufficient to treat the subterranean shale formations, and wherein the swelling and the dispersion of shales are effectively inhibited.

2. The method of claim 1, wherein the subterranean treatment fluid comprises from about 0.5 to about 4.0% wt of the cationic tamarind gum.

3. The method of claim 1, wherein the cationic tamarind gum has a DScat from 0.05 to 0.55 and a Brookfield RV viscosity, at 4.0% wt water solution, 20 rpm and 20° C., of from about 30 to about 1500 mPa*s.

4. The method of claim 1, wherein said cationic tamarind gum is an unpurified cationic tamarind gum comprising from 4 to 65% by dry weight of by-products generated during its chemical preparation, wherein the by-products comprise 2,3-dihydroxypropyltrimethyl ammonium chloride.

* * * * *